(12) United States Patent
Wallner

(10) Patent No.: US 8,690,059 B1
(45) Date of Patent: *Apr. 8, 2014

(54) SYSTEM AND METHOD FOR A BASEBAND NEARFIELD MAGNETIC STRIPE DATA TRANSMITTER

(71) Applicant: George Wallner, Miami Beach, FL (US)

(72) Inventor: George Wallner, Miami Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/826,101

(22) Filed: Mar. 14, 2013

Related U.S. Application Data

(60) Provisional application No. 61/754,608, filed on Jan. 20, 2013.

(51) Int. Cl.
*G06K 7/08* (2006.01)
(52) U.S. Cl.
USPC .......... 235/449; 235/493; 235/494; 235/380; 235/383
(58) Field of Classification Search
USPC .......................... 235/449, 493, 494, 380, 383
See application file for complete search history.

(56) References Cited

U.S. PATENT DOCUMENTS

| | | | |
|---|---|---|---|
| 7,581,678 B2 | 9/2009 | Narendra et al. | |
| 7,810,729 B2 | 10/2010 | Morley, Jr. | |
| 7,954,716 B2 | 6/2011 | Narendra et al. | |
| 8,083,145 B2 | 12/2011 | Narendra et al. | |
| 8,091,786 B2 | 1/2012 | Narendra et al. | |
| 8,302,860 B2 | 11/2012 | McKelvey | |
| 8,313,037 B1* | 11/2012 | Humphrey | 235/493 |
| 2009/0159689 A1* | 6/2009 | Mullen et al. | 235/487 |
| 2010/0213265 A1 | 8/2010 | Narendra et al. | |

* cited by examiner

*Primary Examiner* — Kristy A Haupt
(74) *Attorney, Agent, or Firm* — AKC Patents LLC; Aliki K. Collins

(57) ABSTRACT

The present invention describes a system and a method for a baseband near-field magnetic stripe data transmitter (MST) device that transmits payment card data from a smart-phone, or other electronic device, into a Point of Sale (POS) transaction terminal. The MST device includes a driver and an inductor. The MST receives magnetic stripe data comprising payment card data, processes the received magnetic stripe data and emits high energy magnetic pulses comprising the processed magnetic stripe data that are then received remotely by the magnetic stripe reader of the POS.

23 Claims, 1 Drawing Sheet

US 8,690,059 B1

SYSTEM AND METHOD FOR A BASEBAND NEARFIELD MAGNETIC STRIPE DATA TRANSMITTER

CROSS REFERENCE TO RELATED APPLICATIONS

This application claims the benefit of U.S. provisional application Ser. No. 61/754,608 filed on Jan. 20, 2013 and entitled SYSTEM AND METHOD FOR A BASEBAND NEARFIELD MAGENTIC STRIPE DATA TRANSMITTER, which is commonly assigned and the contents of which are expressly incorporated herein by reference.

FIELD OF THE INVENTION

The present invention relates to a system and a method for a baseband nearfield magnetic stripe data transmitter and in particular to a magnetic stripe data transmitter that transmits payment card data from a smart-phone, or other electronic device, into a Point of Sale transaction terminal.

BACKGROUND OF THE INVENTION

Magnetic stripe payment cards carry a magnetic stripe that contains the payment card data. Magnetic stripe payment cards include credit, debit, gift, and coupon cards, among others. The data is "written" onto the magnetic stripe by alternating the orientation of the magnetic particles embedded into the stripe. Card data is read from the magnetic stripe at a Point of Sale (POS) by swiping the card through a magnetic stripe reader. The reader includes of a reader head and its associated decoding circuitry. When the card is swiped through the reader the magnetic stripe moves in front of the reader head. The moving magnetic stripe, which contains the alternating polarity magnetic domains, creates a fluctuating magnetic field within the narrow sensing aperture of the reader head. The reader head converts this fluctuating magnetic field into an equivalent electrical signal. The decoding circuitry amplifies and digitizes this electrical signal, recreating the same data stream that was originally written onto the magnetic stripe. The encoding of the magnetic stripe is described in the international standard ISO 7811 and 7813.

With the increased popularity and capability of smart-phones, there is a growing desire to use them as mobile wallets and to use them to make payments at the point of sale. The key impediment to adoption has been the lack of data transfer channel between mobile phones and the point of sale terminal. A number of alternatives have been proposed. These include the manual keying of data displayed on the phone's screen into POS terminal, 2D barcodes displayed on the phone's screen and read by a 2D barcode reader, RF ID tags attached to phones and built-in Near Field Communications (NFC) hardware driven by an application in the phone. Of these methods, 2D barcodes and NFC are the most promising. Their wide scale adoption, however, is prevented by a lack of suitable reading devices at the point of sale, and in the case of NFC, also the lack of standardized NFC capability in many smart-phones.

Accordingly, there is a need for improved devices and methods for transmitting payment card data, or other information, from a smart-phone, or other electronic device, remotely into a Point of Sale transaction terminal.

SUMMARY OF THE INVENTION

The present invention describes a system and a method for a baseband near-field magnetic stripe data transmitter that transmits payment card data, or other information, from a smart-phone, or other electronic device, remotely into a Point of Sale transaction terminal via the terminal's magnetic stripe reader.

In general, one aspect of the invention provides a magnetic stripe transmission (MST) device including a driver and an inductor. The MST is configured to receive magnetic stripe data comprising payment card data, to process the received magnetic stripe data and to emit high energy magnetic pulses comprising the processed magnetic stripe data.

Implementations of this aspect of the invention include the following. The MST driver comprises a high power driver circuit. The inductor comprises one or more windings, configured to generate magnetic flux lines that are spread over a large enough area dimensioned to include a sensing aperture of the magnetic read head. The inductor has an inductance value that is configured to cause properly timed current pulses to reach their maximum value at the end of each pulse. The ratio of the inductance and resistance values of the inductor is about 80 µH/Ohm. The one or more windings comprise enamel insulated magnetic wire. The one or more windings comprise conductor traces laid out on rigid or flexible printed circuit substrate. The one or more windings are rectangular shaped. The emitted high energy magnetic pulses are picked up remotely by a magnetic read head from a distance in the range of 1 to 2 inches. The MST is configured to receive magnetic stripe data from a mobile phone via a wired connection to the mobile phone's audio jack. The MST is configured to receive magnetic stripe data from a mobile phone via a wireless connection. The MST is configured to receive magnetic stripe data from a mobile phone via a Bluetooth™ wireless connection. The MST is configured to receive magnetic stripe data from a smart-phone and in this case security is improved by the smart-phone supplementing a transaction transmitted through a payment terminal with a separate secure wireless message sent to a transaction processor. The transaction and the separate secure wireless message are combined for the purposes of authentication. The MST device may further include a secure microcontroller which provides secure local storage of the payment card data and directly drives an inductor driver circuit of the driver. The MST uses the secure microcontroller to encrypt, either partially or fully, the payment card data. The MST device further comprises volatile and non-volatile memory for the secure storage of payment card data and other personal information.

In general, in another aspect, the invention provides a method for transmitting magnetic stripe data including the following. Providing a magnetic transmission (MST) device comprising a driver and an inductor. Receiving magnetic stripe data comprising payment card data by the MST, processing the received magnetic stripe data by the MST, and emitting high energy magnetic pulses comprising the processed magnetic stripe data.

In general, in another aspect, the invention provides a system for a baseband near field magnetic stripe data transmitter including a mobile phone, a magnetic stripe transmission (MST) device and a point of sale (POS) device. The mobile phone comprises a payment wallet application and is configured to transmit magnetic stripe data of a payment card.

The MST device comprises a driver and an inductor, and the MST is configured to receive the magnetic stripe data from the mobile phone, to process the received magnetic stripe data and to emit high energy magnetic pulses comprising the processed magnetic stripe data. The POS device comprises a magnetic read head and a central processing unit (CPU). The magnetic read head is configured to pick-up the emitted high energy magnetic pulses remotely from the MST device and to convert the high energy magnetic pulses into electrical pulses which are further processed by the CPU.

In general, in another aspect, the invention provides a method for a baseband near field magnetic stripe data transmission including the following. Providing a mobile phone comprising a payment wallet application and transmitting magnetic stripe data of a payment card. Next, providing a magnetic stripe transmission (MST) device comprising a driver and an inductor and receiving the magnetic stripe data from the mobile phone by the MST. Next, processing the received magnetic stripe data and emitting high energy magnetic pulses comprising the processed magnetic stripe data by the MST. Next, providing a point of sale (POS) device comprising a magnetic read head and a central processing unit (CPU), and picking-up the emitted high energy magnetic pulses remotely from the MST device by the magnetic read head. Next, converting the picked-up magnetic pulses into electrical pulses by the magnetic read head and then processing the electrical pulses by the CPU.

BRIEF DESCRIPTION OF THE DRAWINGS

Referring to the figures, wherein like numerals represent like parts throughout the several views.

DETAILED DESCRIPTION OF THE INVENTION

The present invention describes a system and a method for a baseband near field magnetic stripe data transmitter that transmits payment card data from a smart-phone, or other electronic device, into a Point of Sale transaction terminal.

Baseband Near Field Magnetic Stripe Transmission (MST), the subject of this invention, uses a pulse modulated magnetic field to transmit from a distance data from a smart-phone into a POS terminal. The system is able to transmit card data into the POS terminal's reader without it being in contact with, or in close proximity to (less then 1 mm), the reader head, or without the need to be inserted into the card reader slot. Furthermore, the system eliminates the need for the swiping motion required with magnetic stripe cards or prior-art magnetic stripe emulation or electronic magnetic stripes, as described by Narenda et al, in U.S. Pat. No. 7,954,716.

The magnetic field is generated by a specially designed inductor, driven by a high power driver circuit. The inductor's unique structure results in a complex omni-directional magnetic field that, from a distance, is able to penetrate the magnetic stripe reader head located in the POS terminal.

Figure 2:
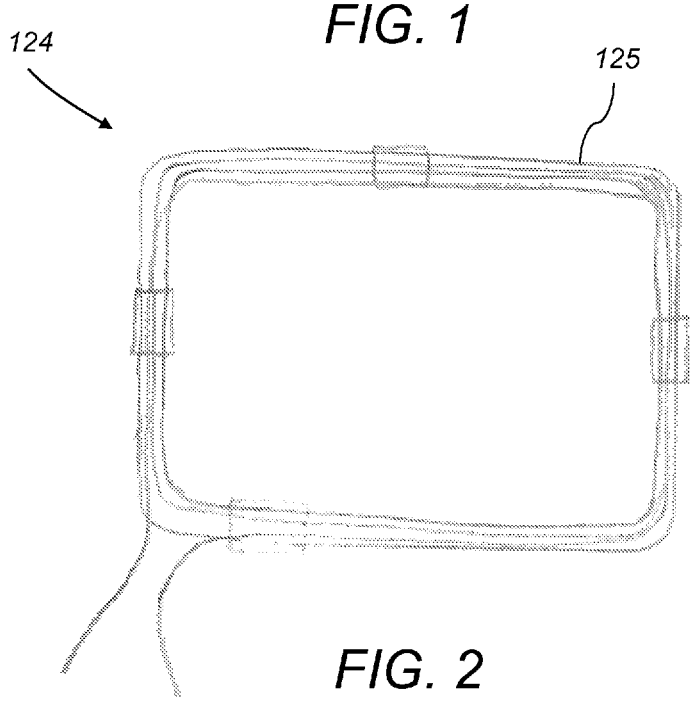
FIG. 2 is a schematic diagram of a typical inductor used to generate the required magnetic field.

Referring to FIG. 2, inductor 124 includes one or more rectangular wire bundle(s) 125 of approximately 40x30 mm outside dimensions with a 3 mm bundle thickness. Inductor 124 has an inductance of such a value that properly timed current pulses reach their maximum value at the end of each pulse. Also, the ratio of inductance and winding resistance values is critical in shaping the current from the driver circuit to result in a magnetic field that closely resembles the magnetic signal seen by the magnetic reader head when a magnetic stripe card is swiped in front of it. In one example, the ratio of inductance to winding resistance is 80 μH/Ohm.

The physical shape of the inductor ensures that the magnetic flux lines are spread over a large enough area to include the sensing aperture of the reader head. The inductor windings may be enamel insulated magnet wire, or alternatively, the inductor my be implemented as a spiral inductor formed by conductor traces laid out on rigid or flexible printed circuit substrates.

Although the inductor is stationary, the inductor is driven by a series of timed current pulses that result in a series of magnetic pulses that resemble the fluctuating magnetic field created by a moving magnetic stripe. The modulation of the field follows the standard magnetic stripe encoding, which in turn results in a stream of electrical pulses on the reader's output that is identical to what would be obtained from a magnetic stripe.

The key benefit of MST is that it works with the existing infrastructure of point of sale card payment terminals. Unlike with NFC or 2D barcode, no external reader or new terminal has to be installed.

Figure 1:
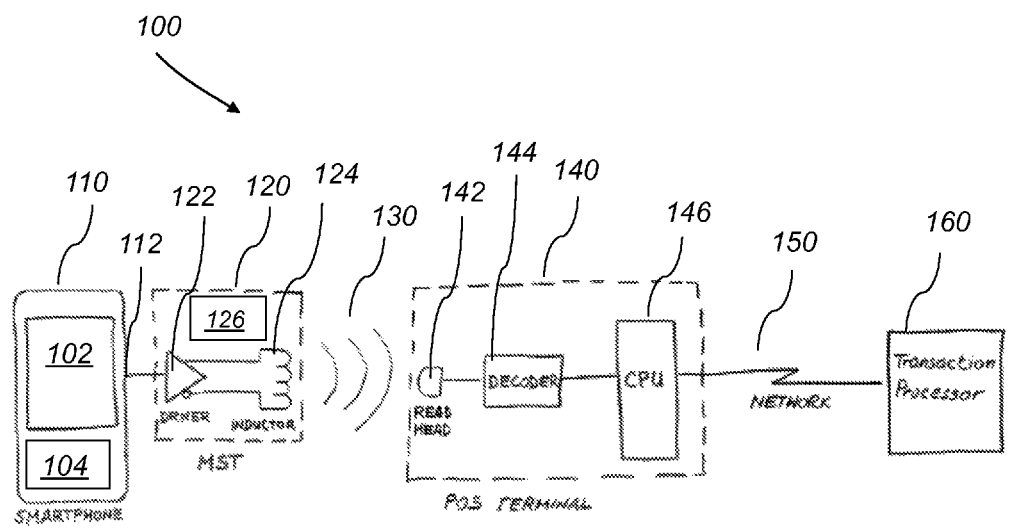
FIG. 1 is an overview diagram of the baseband near-field magnetic stripe data transmitter system, according to this invention.

Referring to FIG. 1, in one embodiment of this invention 100, a suitable driver 122 and inductor 124 are contained in a small capsule 120, which is connected to the audio jack 112 of the phone 110. Smart-phone 110 is loaded with a wallet software application 102. The phone 110 is connected to the Magstripe Transmitter 120 via its audio jack 112. To make a payment at a point of sale location equipped with a common card payment terminal capable of reading standard ISO/ABA magnetic stripe cards 140 the consumer selects the wallet application 102 on his smart-phone 110 and selects one of the pre-loaded payment cards (i.e., Visa, Mastercard, Amex) he wants to use for the payment. He holds the phone close (1 to 2 inches) to the point of sale terminal 140 and presses the pay icon/key 104 on the phone 110. The wallet application 102 in the phone 110 sends to the MST 120 via the audio jack 112 a stream of pulses that contain the selected card's magnetic stripe data. The MST 120 amplifies, shapes and emits the pulses in the form of suitably modulated high energy magnetic impulses 130. The magnetic impulses 130 are picked up by the magstripe reader head 142 located in the point of sale payment terminal 140 and are converted into electrical pulses. The resulting electrical pulses are decoded by decoder 144 and processed by its central processing unit (CPU) 146, just like it would process a standard magnetic stripe card that was swiped through its reader slot. The merchant enters the payment amount and the transaction is sent by the POS terminal 140 via the network 150 to the payment transaction processor 160. The transaction processor 160 returns the transaction authorization and the POS terminal 140 prints a receipt. With the exception of the card entry method, the entire transaction is completed in the same manner as with a standard magnetic stripe card.

In another embodiment of MST 120, security is improved by the smart-phone supplementing the transaction transmitted through the payment terminal with a separate secure wireless message sent to the processor, where the two transactions are combined for the purposes of authentication.

In a further embodiment, the MST 120 also contains a secure microcontroller 126 which provides secure local storage of the card data and directly drives the inductor driver circuit 122. This method, among some other advantages, allows the MST to operate detached from the phone in a store-and-transmit mode. In some embodiments, the MST further includes volatile and non-volatile memory for the secure storage of card data and other personal information.

Yet another possible implementation uses Bluetooth™ communications between the phone 110 and the MST 120, where two-way communications is used for enhanced security and flexibility, including the retrieval by the phone of card data stored in the secure element formed by the MST's secure microcontroller 126.

In yet another possible implementation the MST 120 uses its built-in secure microcontroller 126 to encrypt, either partially or fully, the card data and transmits it via the magnetic field to the point of sale card reader.

In yet another possible implementation the payment card data comprise card verification value (CVV) data that are changed dynamically. In this case, the security of a transaction is improved due to the dynamic changing of the CVV data.

Several embodiments of the present invention have been described. Nevertheless, it will be understood that various modifications may be made without departing from the spirit and scope of the invention. Accordingly, other embodiments are within the scope of the following claims.

What is claimed is:

1. A magnetic stripe transmission (MST) device comprising:
    a driver; and
    an inductor;
    wherein the MST is configured to receive a stream of pulses comprising magnetic strip data of a payment card, to amplify and shape the received stream of pulses and to generate and emit high energy magnetic pulses comprising the magnetic stripe data; and
    wherein inductor comprises one or more windings, and wherein said one or more windings are configured to generate magnetic flux lines that are spread over a large enough area dimensioned to include a sensing aperture of the magnetic read head and to generate an inductance value that is configured to cause properly timed current pulses to reach their maximum value and thereby to cause maximum induced voltage in the magnetic read head.

2. The MST device of claim 1, wherein the magnetic read head converts the high energy magnetic pulses into electrical pulses.

3. The MST device of claim 2 wherein the magnetic read head is comprised in a point of sale (POS) device and wherein the POS further comprises a central processing unit (CPU).

4. The MST device of claim 1, wherein the emitted high energy magnetic pulses are picked up remotely by a magnetic read head from a distance in the range of 1 to 2 inches.

5. The MST device of claim 1, wherein the driver comprises a high power driver circuit.

6. The MST device of claim 1, wherein the ratio of the inductance and resistance values of the one or more windings is about 80 µH/Ohm.

7. The MST device of claim 1, wherein the one or more windings comprise enamel insulated magnetic wire.

8. The MST device of claim 1, wherein the one or more windings comprise conductor traces laid out on rigid or flexible printed circuit substrate.

9. The MST device of claim 1, wherein the one or more windings comprise rectangular shaped windings.

10. The MST device of claim 1 wherein the MST is configured to receive magnetic stripe data from a mobile phone via a wired connection to the mobile phone's audio jack.

11. The MST device of claim 1 wherein the MST is configured to receive magnetic stripe data from a mobile phone via a wireless connection.

12. The MST device of claim 1 wherein the MST is configured to receive magnetic stripe data from a mobile phone via a Bluetooth™ wireless connection.

13. The MST device of claim 1, wherein the MST is configured to receive magnetic stripe data from a smart-phone and wherein security of a transaction is improved by the smart-phone supplementing a transaction transmitted through a payment terminal with a separate secure wireless message sent to a transaction processor, and wherein the transaction and the separate secure wireless message are combined for the purposes of authentication.

14. The MST device of claim 1, further comprising a secure microcontroller which provides secure local storage of the payment card data and directly drives an inductor driver circuit of the driver.

15. The MST device of claim 14, wherein the MST uses the secure microcontroller to encrypt, either partially or fully, the payment card data.

16. The MST device of claim 1, further comprising volatile and non-volatile memory for the secure storage of payment card data and other personal information.

17. The MST device of claim 1, wherein the payment card data comprise card verification value (CVV) data and wherein security of a transaction is improved by changing the CVV data dynamically.

18. A method for transmitting magnetic stripe data comprising:
    providing a magnetic transmission (MST) device comprising a driver and an inductor;
    receiving a stream of pulses comprising magnetic stripe data comprising payment card data by the MST;
    amplifying and shaping the received stream of pulses by the MST; and
    generating and emitting high energy magnetic pulses comprising the magnetic stripe data; and
    wherein the inductor comprises one or more windings, and wherein said one or more windings are configured to generate magnetic flux lines that are spread over a large enough area dimensioned to include a sensing aperture of the magnetic read head and to generate an inductance value that is configured to cause properly timed current pulses to reach their maximum value and thereby to cause maximum induced voltage in the magnet read head.

19. A system for a baseband near field magnetic stripe data transmitter comprising:
    a mobile phone comprising a payment wallet application and being configured to transmit a stream of pulses comprising magnetic stripe data of a payment card;
    a magnetic stripe transmission (MST) device comprising a driver and an inductor, wherein the MST is configured to receive the stream of pulses from the mobile phone, to amplify and shape the received stream of pulses and to generate and emit high energy magnetic pulses comprising the magnetic stripe data;
    a point of sale (POS) device comprising a magnetic read head and a central processing unit (CPU), wherein the magnetic read head is configured to pick-up the emitted high energy magnetic pulses remotely from the MST device and to process the high energy magnetic pulses into electrical pulses by the CPU; and
    wherein the inductor comprises one or more windings, and wherein said one or more windings are configured to generate magnetic flux lines that are spread over a large enough area dimensioned to include a sensing aperture of the magnetic read head and to generate an inductance value that is configured to cause properly timed current pulses to reach their maximum value and thereby to cause maximum induced voltage in the magnetic read head.

20. A method for a baseband near field magnetic stripe data transmission comprising:

providing a mobile phone comprising a payment wallet application and transmitting a stream of pulses comprising magnetic stripe data of a payment card;

providing a magnetic stripe transmission (MST) device comprising a driver and an inductor and receiving the a stream of pulses from the mobile phone by the MST;

amplifying and shaping the received a stream of pulses and generating and emitting high energy magnetic pulses comprising the magnetic stripe data by the MST;

providing a point of sale (POS) device comprising a magnetic read head and a central processing unit (CPU);

picking-up the emitted high energy magnetic pulses remotely from the MST device by the magnetic read head;

converting the picked-up magnetic pulses into electrical pulses by the magnetic read head and then processing the electrical pulses by the CPU; and wherein the inductor comprises one or more windings, and wherein said one or more windings are configured to generate magnetic flux lines that are spread over a large enough area dimensioned to include a sensing aperture of the magnetic read head and to generate an inductance value that is configured to cause properly timed current pulses to reach their maximum value and thereby to cause maximum induced voltage in the magnetic read head.

21. A system for a baseband near field magnetic stripe data transmitter comprising:

a magnetic stripe transmission (MST) device comprising a driver and an inductor, wherein the MST device is configured to receive the stream of pulses, to amplify and shape the received stream of pulses and to generate and emit high energy magnetic pulses comprising the magnetic stripe data;

wherein the emitted high energy magnetic pulses are configured to be picked up remotely by a magnetic read head;

wherein the inductor comprises one or more windings, and wherein said one or more windings are configured to generate magnetic flux lines that are spread over a large enough area dimensioned to include a sensing aperture of the magnetic read head and to generate an inductance value that is configured to cause properly timed current pulses to reach their maximum value and thereby to cause maximum induced voltage in the magnetic read head; and wherein the one or more windings comprise rectangular shaped windings.

22. A system for a baseband near field magnetic stripe data transmitter comprising:

a magnetic stripe transmission (MST) device comprising a driver and an inductor, wherein the MST device is configured to receive the stream of pulses, to amplify and shape the received stream of pulses and to generate and emit high energy magnetic pulses comprising the magnetic stripe data; and wherein the inductor is driven by a series of timed current pulses that result in a series of magnetic pulses that resemble the fluctuating magnetic field created by a moving magnetic stripe.

23. The MST device of claim 22, wherein the inductor comprises one or more windings, configured to generate magnetic flux lines that are spread over a large enough area dimensioned to include a sensing aperture of the magnetic read head and to generate an inductance value that is configured to cause properly timed current pulses to reach their maximum value at the end of each pulse.

* * * * *